(12) United States Patent
Nguyen et al.

(10) Patent No.: US 7,403,523 B2
(45) Date of Patent: Jul. 22, 2008

(54) METHODS AND SYSTEMS FOR TUNNELING PACKETS OF A RING-TOPOLOGY-BASED LINK LEVEL COMMUNICATIONS PROTOCOL OVER A NETWORK HAVING A STAR TOPOLOGY USING A STAR-TOPOLOGY-BASED LINK LEVEL COMMUNICATIONS PROTOCOL

(75) Inventors: Thinh Q. Nguyen, Raleigh, NC (US); Qiao Xu, Raleigh, NC (US); Robert Wallace, Apex, NC (US)

(73) Assignee: Tekelec, Morrisville, NC (US)

( * ) Notice: Subject to any disclaimer, the term of this patent is extended or adjusted under 35 U.S.C. 154(b) by 725 days.

(21) Appl. No.: 10/833,797

(22) Filed: Apr. 28, 2004

(65) Prior Publication Data

US 2005/0243815 A1    Nov. 3, 2005

(51) Int. Cl.
*H04L 12/28* (2006.01)
*H04L 12/56* (2006.01)
*H04J 3/16* (2006.01)
*H04J 3/22* (2006.01)

(52) U.S. Cl. ................ 370/390; 370/392; 370/396; 370/408; 370/466

(58) Field of Classification Search ......... 370/400–407, 370/408, 390, 392, 396, 466
See application file for complete search history.

(56) References Cited

U.S. PATENT DOCUMENTS 6,647,428 B1 * 11/2003 Bannai et al. ............... 709/245
6,963,561 B1 * 11/2005 Lahat ......................... 370/356

(Continued)

OTHER PUBLICATIONS

"Am79C976 PCnet™-PRO Product Brief High Performance 10/100 Mbps PCI Ethernet Controller with Large Packet Memory Support," wysiwyg://1/http://www.amd.com/us-en/Con...Information/ 0,,50_2330_6629_2421,00.html, p. 1-4, (Downloaded Apr. 27, 2004).

(Continued)

*Primary Examiner*—Melvin Marcelo
*Assistant Examiner*—Farah Faroul
(74) *Attorney, Agent, or Firm*—Jenkins, Wilson, Taylor & Hunt, P.A.

(57) ABSTRACT

Methods and systems for distributing messages of a ring-topology-based link level communications protocol over a star-topology using a star-topology-based link level communications protocol are disclosed. According to one method, when a packet of the ring-topology-based link level communications protocol is received, it is determined whether the packet is to be sent to a number of destinations and returned to a sender. If the packet is intended for distribution to a number of destinations and return to the sender, the packet is encapsulated in a frame of the star-topology-based link level communications protocol, the destination address in the frame is set to a next destination address in a virtual ring topology, the frame is forwarded to a switch. The switch forwards the packet to the next destination in the virtual ring based on the input port and the destination address of the star-topology-based link level communications protocol. The process continues until the packet reaches the last destination in the virtual ring where the packet is encapsulated in a frame of the star-topology-based link level communications protocol and returned to the sender.

27 Claims, 9 Drawing Sheets

U.S. PATENT DOCUMENTS

| | | | |
|---|---|---|---|
| 6,963,575 B1 * | 11/2005 | Sistanizadeh et al. | 370/404 |
| 6,967,956 B1 * | 11/2005 | Tinsley et al. | 370/466 |
| 7,164,692 B2 * | 1/2007 | Cox et al. | 370/466 |
| 7,315,511 B2 * | 1/2008 | Morita et al. | 370/227 |
| 2002/0131400 A1 * | 9/2002 | Tinsley et al. | 370/352 |
| 2005/0190757 A1 * | 9/2005 | Sajassi | 370/389 |

OTHER PUBLICATIONS

CHI, "Merging ATCA, PCI Express Opens Next-Gen Backplane Designs," PLX Technology, Inc., p. 1-6, (Dec. 18, 2002).

* cited by examiner

METHODS AND SYSTEMS FOR TUNNELING PACKETS OF A RING-TOPOLOGY-BASED LINK LEVEL COMMUNICATIONS PROTOCOL OVER A NETWORK HAVING A STAR TOPOLOGY USING A STAR-TOPOLOGY-BASED LINK LEVEL COMMUNICATIONS PROTOCOL

TECHNICAL FIELD

The present invention relates to methods and systems for tunneling packets of a first link level communications protocol in packets of a second link level communications protocol. More particularly, the present invention relates to methods and systems for tunneling packets of a ring-topology-based link level communications protocol over a network having a star topology using a star-topology-base link level communications protocol.

BACKGROUND ART

Some telecommunications network routing elements, such as signal transfer points and SS7/IP gateways, have distributed internal processing architectures. In such architectures, different processing modules or cards perform different telecommunications functions. For example, some processing modules or cards may interface with external signaling links. Other processing modules or cards may perform maintenance and control functions. Still other processing modules or cards may perform database-related services for received signaling messages.

Figure 1:
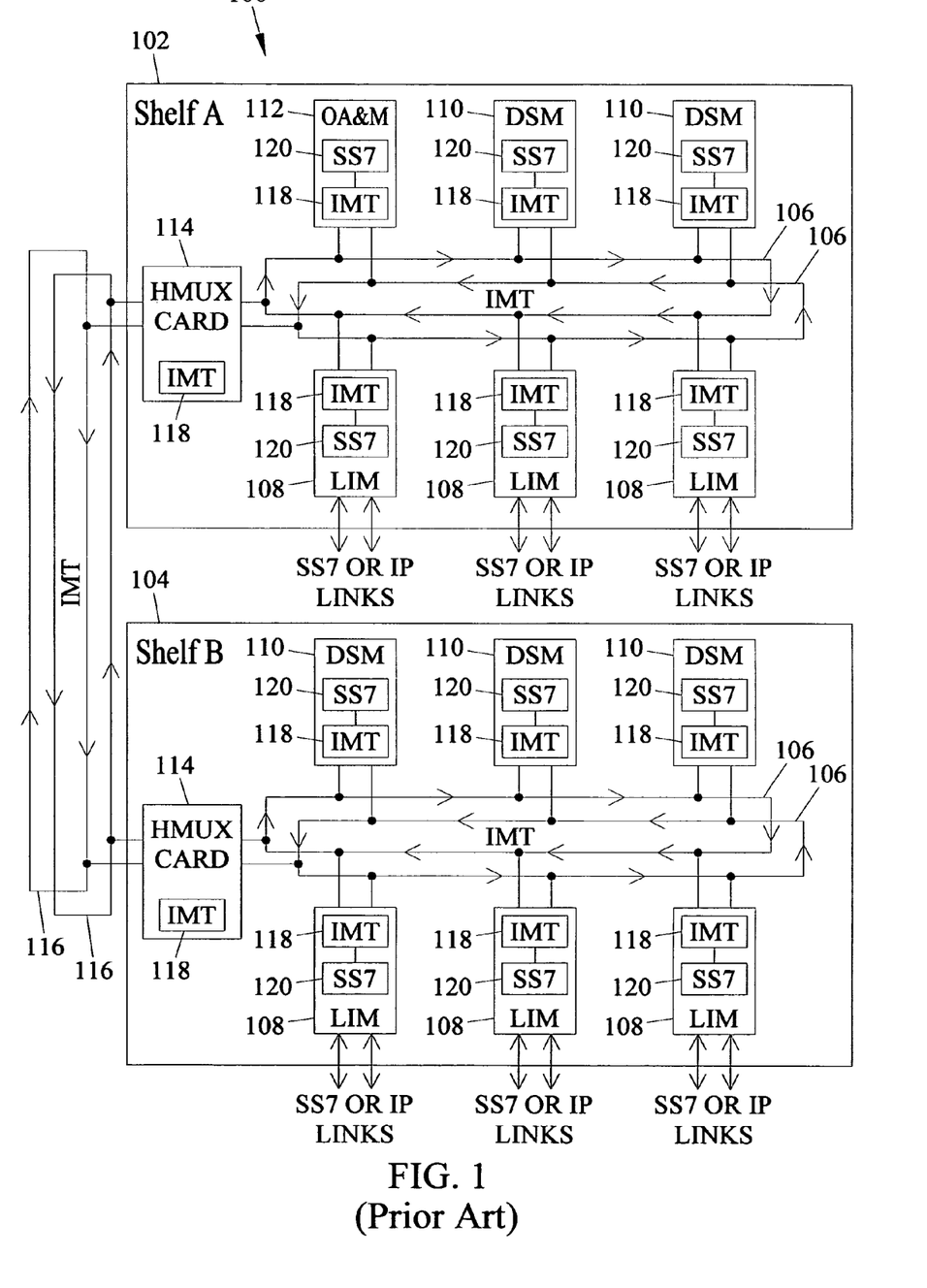
FIG. 1 is block diagram of a conventional signaling message routing node having a ring topology in which interprocessor communication occurs using a ring-topology-based link level communications protocol.

In order for a routing node with a distributed internal processing architecture to function properly, it is necessary to provide a mechanism for inter-processor communication. One conventional method for inter-processor communication is to use a ring topology. FIG. 1 is a block diagram of a conventional signaling message routing node where processing modules or cards are connected via a ring topology. Referring to FIG. 1, signaling message routing node 100 includes a first shelf 102 and a second shelf 104. Shelves 102 and 104 each include a plurality of processing modules connected to each other via counter-rotating, dual-ring buses 106. In the illustrated example, shelves 102 and 104 include link interface modules (LIMs) 108 for interfacing with external SS7 or IP signaling links, database services modules (DSMs) 110 for providing database-related services, such as LNP and global title translation, an operations, administration, and maintenance (OA&M) module 112 for performing maintenance functions, and a high speed multiplexer (HMUX) 114 for providing communication between shelves via high speed, counter-rotating, dual-ring buses 106. For interprocessor communication, modules 108-112 each implement a protocol stack that includes an interprocessor message transport (IMT) layer 118. HMUX cards 114 may also implement an IMT layer 118. In addition to IMT layers 118, modules 108-112 may also implement an SS7 layer 120.

IMT layers 118 provide link level communications between processor cards via a ring-topology-based link level communications protocol, referred to as the IMT protocol. The IMT protocol defines packet formats, determines card presence and availability, and establishes connections between cards. The IMT protocol is also used to carry SS7 signaling messages between cards.

One important function of the IMT protocol is to distribute special-purpose messages to all shelves in the routing node and return the messages to the sender. Examples of special-purpose messages that must be distributed and returned to the sender include flow control messages and test signaling units (TSUs). One type of flow control message used in signal transfer points is referred to as a ticket voucher request. A ticket voucher request may be originated by a link interface module in one shelf when the link interface module receives a message signaling unit (MSU) requiring SCCP service. The ticket voucher request is distributed to all shelves. A shelf having a database services module with available processing capacity will grant the request and modify the ticket voucher request to indicate that the request has been granted. The ticket voucher request message is returned to the originating link interface module after being distributed among all shelves.

In a ring topology, such as that illustrated in FIG. 1, distributing messages among all shelves and returning the messages to the originating card is easy because the cards and shelves are arranged in a ring topology and the IMT protocol provides a mechanism for such distribution and return. In this mechanism, when a card originates a message with the IMT source address being equal to the IMT destination address, that message is automatically distributed among all shelves in the ring topology and returned to the originator. The same mechanism can be used to distribute TSUs and return the TSUs to the originator.

In light of the availability of low cost hardware for high-speed link level communications, such as gigabit-Ethernet hardware, it is desirable to migrate from ring-topology-based link level topologies and communications protocols to high-speed link level communications protocols. One problem with migrating to a new link level communications protocol is that existing link level communications functions should be preserved. For example, the function described above where a message is distributed among all cards in a ring and returned to the originator does not map directly to gigabit Ethernet because gigabit Ethernet is based on a star topology, and gigabit-Ethernet does not allow source addressed frames. Accordingly, there exist a need for improved methods and systems for distributing packets of a ring-topology-based link level communications protocol using packets or frames of a star-topology-based link level communications protocol.

DISCLOSURE OF THE INVENTION

According to one aspect, a method for tunneling packets of a ring-topology-based link level communications protocol in packets of a star-topology-based link level communications protocol includes receiving a packet of a ring-topology-based link level communications protocol. The method includes determining whether the packet is addressed for distribution among a plurality of processing modules in a signaling message routing node and return to the originator. If the message is not addressed for distribution and return to the originator, the destination address and the ring-topology-based link level communications protocol is mapped to a destination address in a star-topology-based link level communications protocol. The packet is then encapsulated in a packet of the star-topology-based link level communications protocol and sent to its destination.

If the packet is addressed for distribution and return to the sender, rather than mapping the destination address in the ring-topology-based link level communications protocol to a destination address in the star-topology-based link level communications protocol, the destination address in the star-topology-based link level communications protocol is selected from a virtual ring frame distribution table. The packet is then encapsulated in a packet of the star-topology-based link level communications protocol, distributed among modules in the star topology, and eventually returned to the originating module.

Thus, by distributing packets of a ring-topology-based link level communications protocol using packets of a star-topology-based link level communications protocol, the present invention enables existing nodes or networks that use ring-topology-based link level communications protocols to migrate to star-topology-based link level communications protocols without loss of the functionality provided by ring-topology-based link level communications protocols. By allowing packets of a ring-topology-based link level communications protocol to be distributed among modules or nodes in a star-topology-based topology and returned to the originator, the present invention provides a virtual ring topology, even though nodes or modules are connected in a star topology. As a result, migration from ring topologies to star topologies is transparent to the nodes or modules using the topologies.

Accordingly, it is an object of the invention to provide methods and systems for tunneling packets of a ring-topology-based link level communications protocol in packets of star-topology-based link level communications protocol.

An object of the invention having been stated hereinabove, and which is achieved in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 2A:
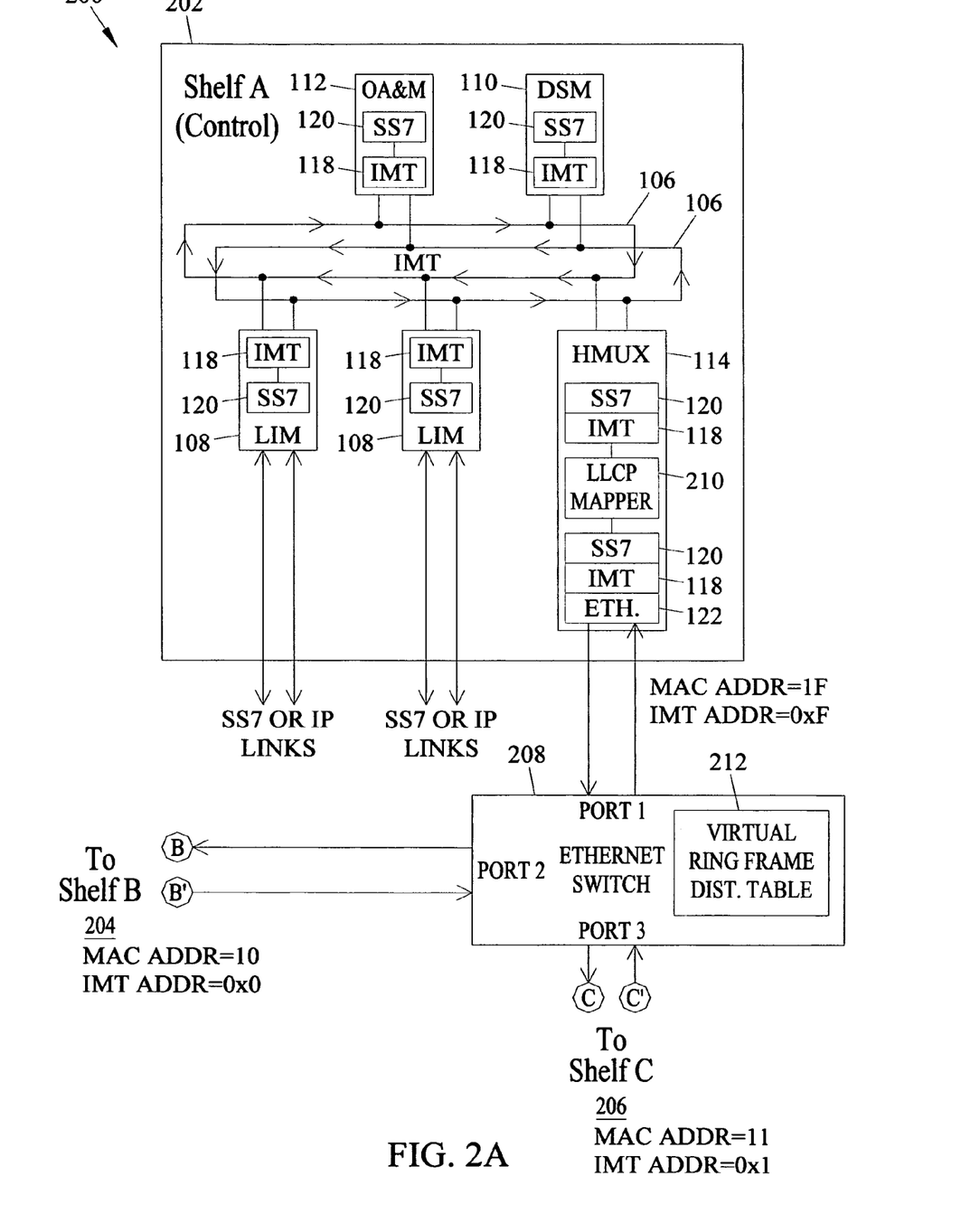
FIGS. 2A-2C are a block diagram of a signaling message routing node in which inter-shelf communication occurs by tunneling packets of ring-topology-based link level communications protocol in packets of a star-topology-based link level communications protocol and intra-shelf communication occurs using a ring-topology-based link level communications protocol according to an embodiment of the present invention.
Figure 2B:
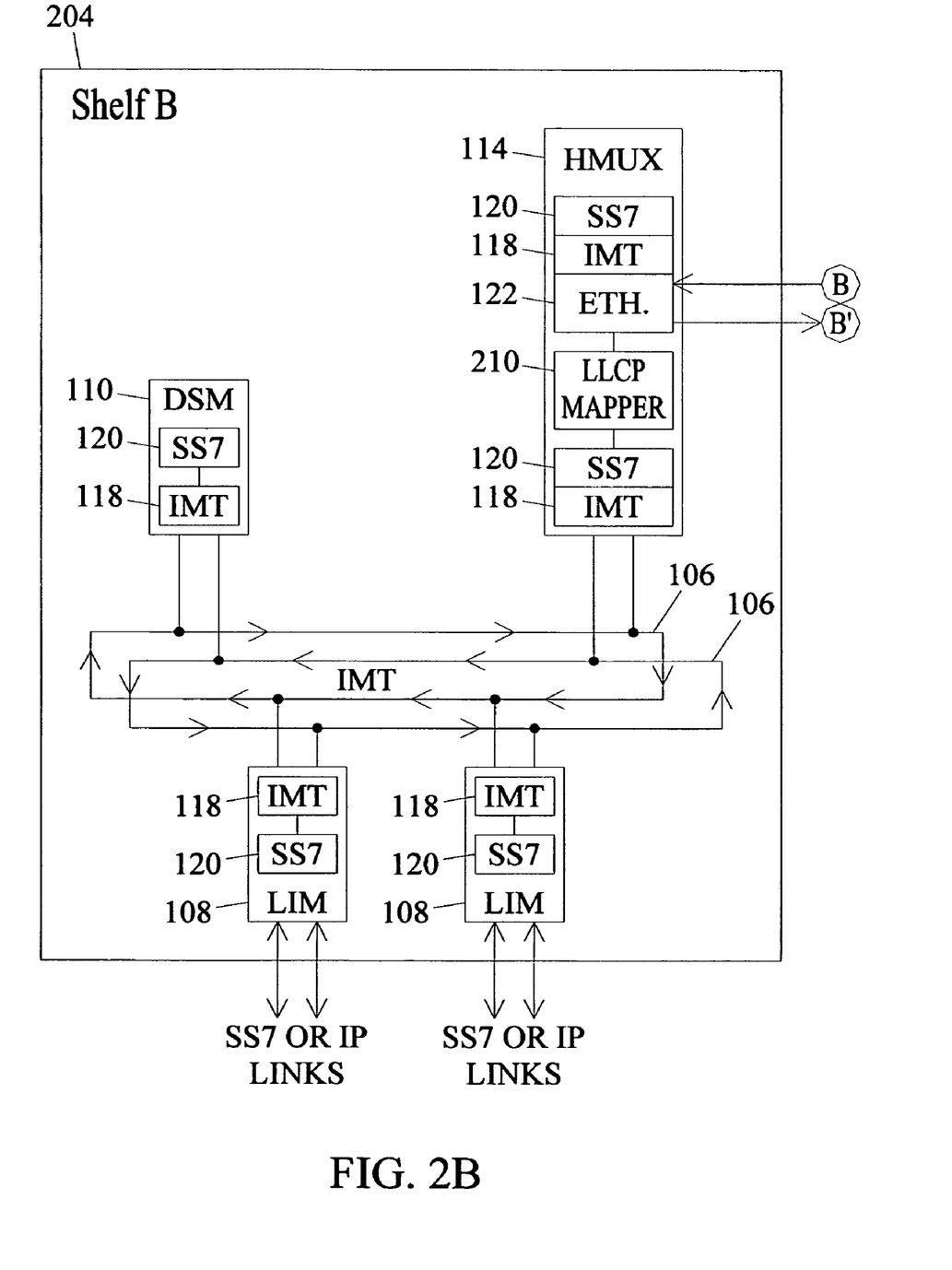
Figure 2C:
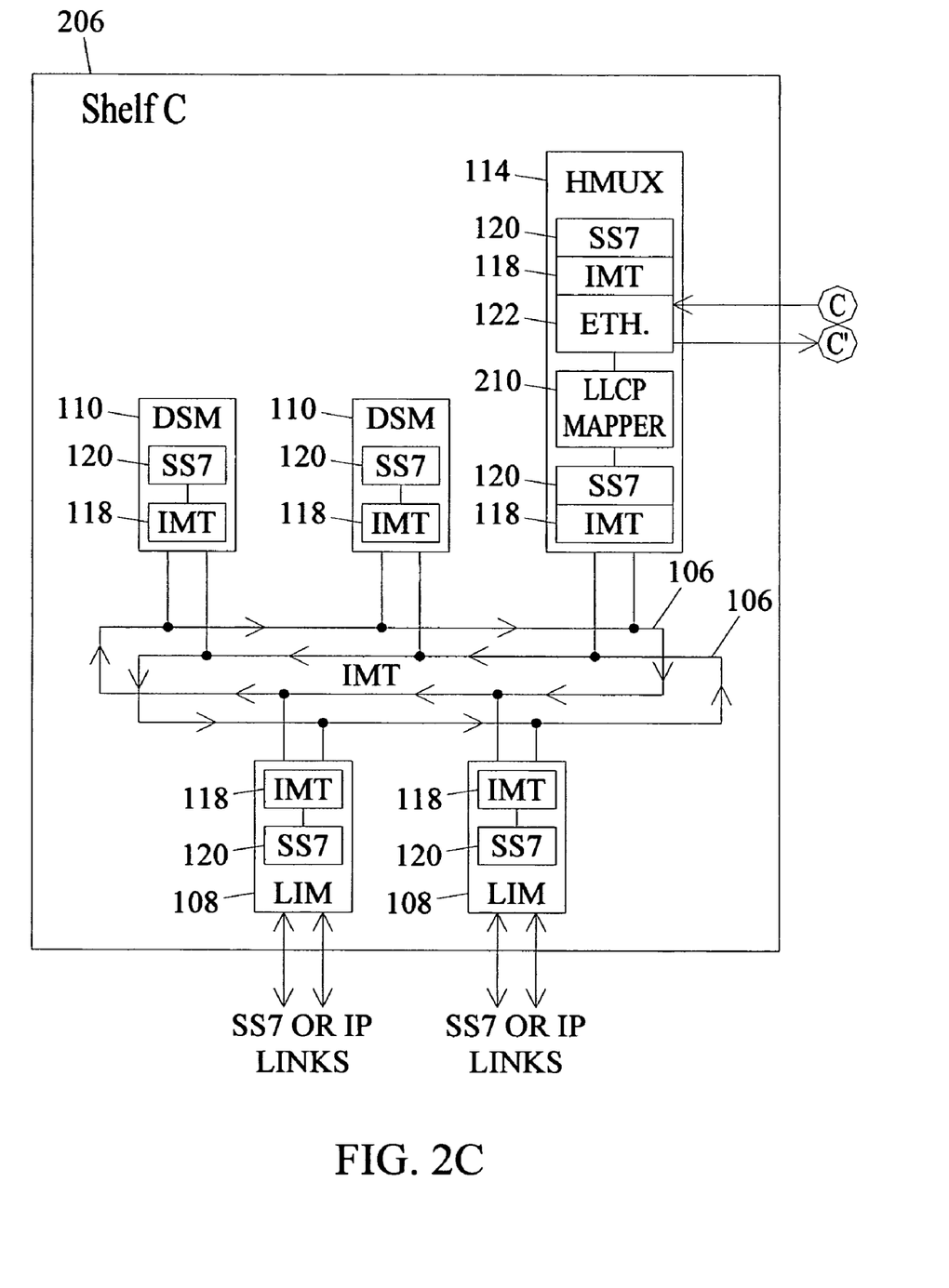

As discussed above, the present invention includes methods and systems for transporting messages of a ring-topology-based link level communications protocol in packets of a star-topology-based link level communications protocol. FIGS. 2A-2C are a block diagram of a signaling message routing node where communication between cards occurs using a ring-topology-based link level communications protocol and communication between shelves occurs using a star-topology-based link level communications protocol. Referring to FIGS. 2A-2C, a signaling message routing node 200 includes shelve 202 (illustrated in FIG. 2A), shelf 204 (illustrated in FIG. 2B), and shelf 206 (illustrated in FIG. 2C). Each shelf may include a plurality of printed circuit board or card slots for receiving various printed circuit boards, referred to herein as modules, for performing telecommunications signaling functions. Shelf 202 may be a control shelf including an OA&M module 112, a database services module 110, link interface modules 108, and an HMUX module 114. Shelf 204 includes link interface modules 108, database services module 110, and HMUX module 114. Shelf 206 includes link interface modules 108, database services module 110, and HMUX module 114. Communication between modules within each shelf occurs using a ring-topology-based link level communications protocol over counter-rotating, dual-ring buses 106.

According to the present invention, communication between shelves 202, 204, and 206 occurs using a star-topology-based link level communications protocol. In the illustrated example, the star-topology-based link level communications protocol is Ethernet. Accordingly, shelves 202, 204, and 206 are connected to each other via Ethernet switch 208. In order to tunnel packets of the ring-topology-based link level communications protocol using packets of the star-topology-based link level communications protocol, each HMUX card includes a link level communications protocol mapper 210 and an Ethernet layer 122. Each link level communications protocol mapper 210 performs address translation, encapsulation, and decapsulation of link level communications protocol packets. Exemplary functions provided by link level communications protocol mapper 210 will be described in detail below. Ethernet layers 122 implement standard Ethernet communications functions. In one example, Ethernet layers 122 may be implemented using gigabit Ethernet hardware.

Ethernet switch 208 includes a virtual ring frame distribution table 212 for distributing Ethernet frames between shelves in a manner that makes shelves 202, 204, and 206 appear as if they were connected in a ring topology, rather than a star topology. An exemplary configuration for virtual ring frame distribution table 212 will be described in detail below.

Figure 3:
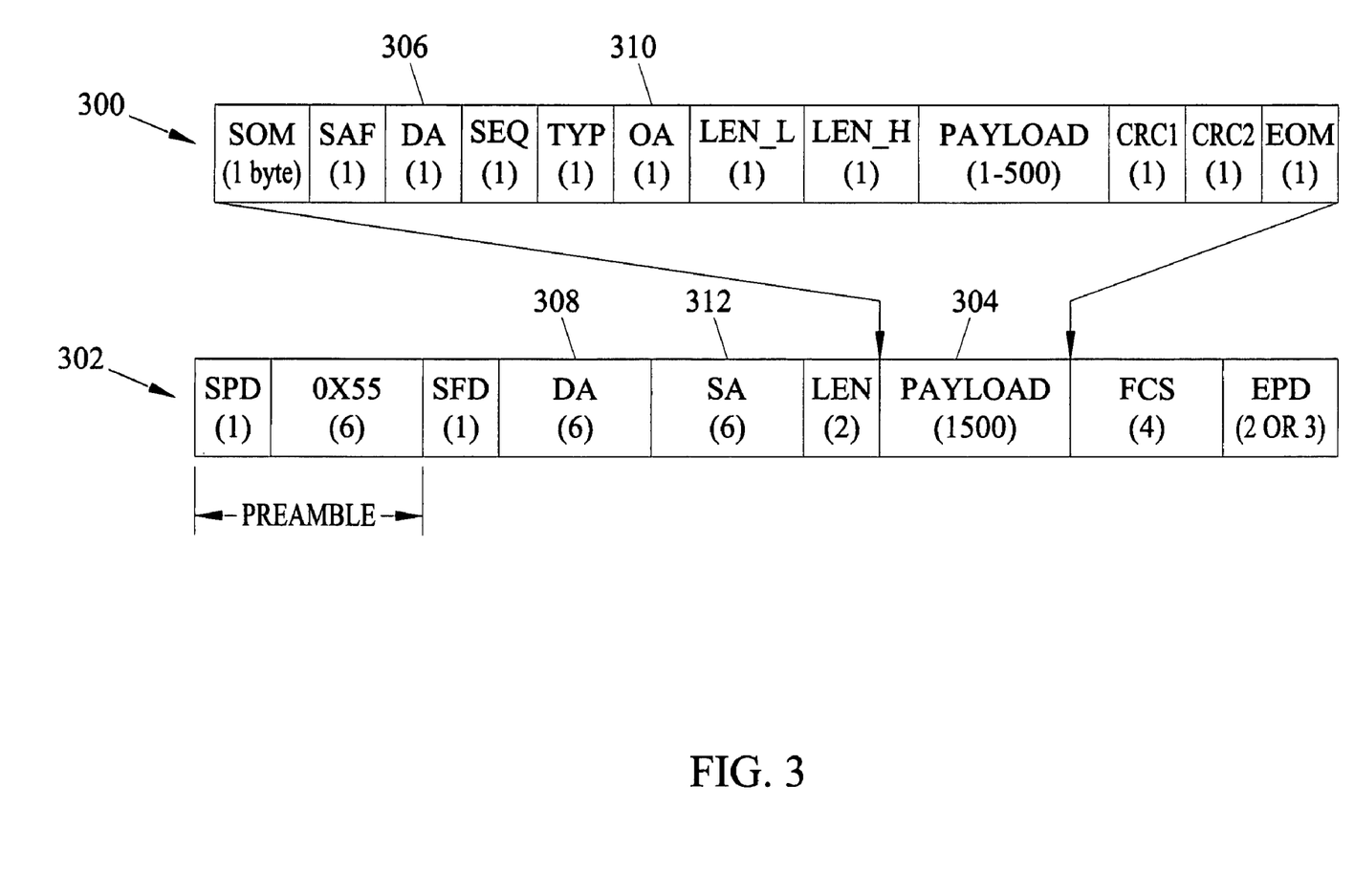
FIG. 3 is a block diagram illustrating encapsulation of packets of a ring-topology-based link level communications protocol in packets of a star-topology-based link level communications protocol according to an embodiment of the present invention.

Packets transmitted between shelves 202, 204, and 206 are preferably Ethernet-encapsulated IMT packets. FIG. 3 illustrates an example of an Ethernet-encapsulated IMT packet that may be used for inter-shelf communications in the embodiment illustrated in FIGS. 2A-2C. Referring to FIG. 3, an IMT packet 300 is encapsulated in a gigabit Ethernet frame 302. More particularly, IMT packet 300 is encapsulated in payload portion 304 of Ethernet frame 302. IMT destination address 306 is mapped to Ethernet destination address 308. In addition, IMT originating address 310 is mapped to Ethernet source address 312. One method for performing these mappings will now be described in detail.

Figure 4:
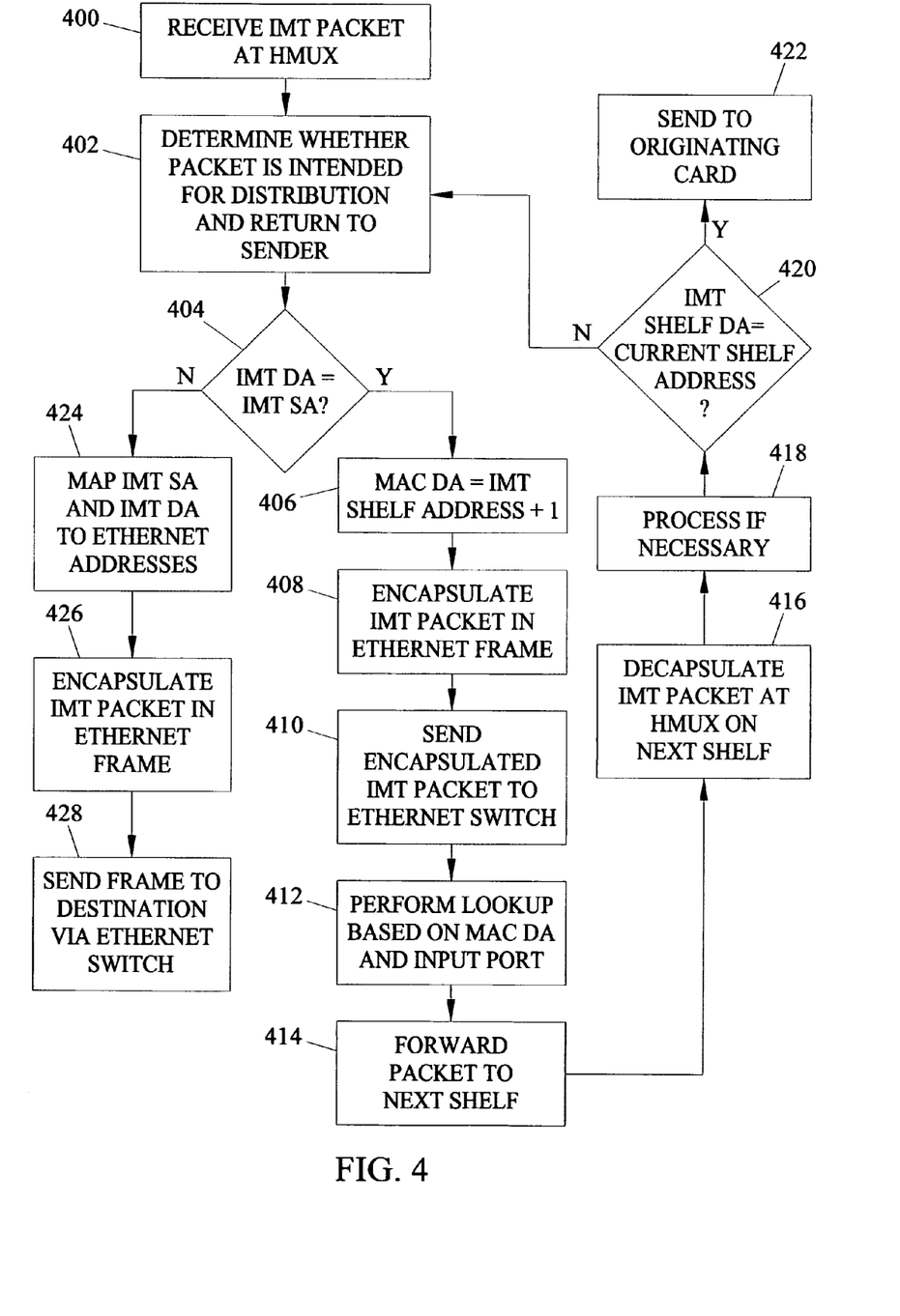
FIG. 4 is a flow chart illustrating exemplary steps for tunneling packets of a ring-topology-based link level communications protocol in packets of a star-topology-based link level communications protocol according to an embodiment of the present invention.

FIG. 4 is a flow chart illustrating exemplary steps that may be performed by link level communications protocol mappers 210 in mapping IMT destination addresses to Ethernet destination addresses and for tunneling IMT packets in Ethernet packets according to an embodiment of the present invention. Referring to FIG. 4, in step 400, a link level communications protocol mapper 210 on HMUX card 114 receives an IMT packet. The packet may originate from an SS7 application on one of the cards on the same shelf as the receiving HMUX card. In steps 402 and 404, link level communications protocol mapper 210 determines whether the packet is intended for distribution to other shelves and return to sender. In the IMT protocol, packets that are intended for distribution among shelves and return to the sender are identified by an IMT destination address equal to the IMT source address. Accordingly, in step 404, it is determined whether the IMT destination address is equal to the IMT source address. If the packet is determined to have the same IMT destination and source addresses, control proceeds to step 406 where the MAC destination address is set to the IMT address of the shelf that is transmitting the packet plus one. For example, if a shelf with IMT address 1 originates a self-addressed packet, the MAC destination address will be 2. When shelf 2 receives the self-addressed IMT packet, shelf 2 will address encapsulating Ethernet the frame to MAC destination address 3. The source MAC address is set to the MAC address of the shelf that is sending the Ethernet frame. In step 408, the IMT packet is encapsulated in an Ethernet frame.

In step 410, the encapsulated IMT packet is sent to the Ethernet switch. In step 412, the Ethernet switch performs a lookup based on the MAC destination address and input port of the switch from which the packet was received. Based on the results of the lookup in the virtual frame distribution table, in step 414, the Ethernet-encapsulated IMT packet is forwarded to the next shelf. The next shelf may be any of the shelves in the signaling message routing node, including the first shelf. In step 416, the Ethernet-encapsulated IMT packet is decapsulated at the HMUX card on the next shelf. In step 418, the IMT packet is processed if necessary. For example, if the IMT packet is a ticket voucher request that has not been granted, the HMUX card may modify the packet to indicate that the request has been granted if the SCCP cards in the particular shelf have available processing capacity. If the IMT packet includes a ticket voucher request that has been granted, further processing on the recipient shelf is not required. In this case, the HMUX card will not modify the IMT packet.

In step 420, the HMUX card determines whether the IMT destination address in the frame is equal to the current shelf address. If the IMT destination address is equal to the current shelf address, the packet has completed its traversal of the virtual ring. Accordingly, control proceeds to step 422 where the packet is returned to the originating card. If the IMT destination address is not equal to the current shelf address, control returns to step 402 where it is determined whether the packet is intended for distribution and returned to the sender. Steps 402-420 may be repeated at each HMUX card until the packet is returned to the originating card.

Returning to step 404, if the IMT source and destination addresses are not equal, control proceeds to step 424 where the IMT source and destination address are mapped to Ethernet addresses. This step may be performed using a table of statically defined mappings between IMT addresses and MAC addresses. Table 1 shown below illustrates exemplary mappings between IMT addresses and MAC addresses. Although Table 1 indicates that the mappings are for destination addresses, the source data may be used to map IMT source addresses to MAC source addresses.

TABLE 1

Address Mapping Between IMT DA and MAC DA

| Destination Shelf Address IMT DA [7:4] | Destination MAC Address MAC DA(1) => MAC DA(6) |
|---|---|
| 0x0 | 0000.1000.0000 |
| 0x1 | 0000.1100.0000 |
| 0x2 | 0000.1200.0000 |
| 0x3 | 0000.1300.0000 |
| 0x4 | 0000.1400.0000 |
| 0x5 | 0000.1500.0000 |
| 0x6 | 0000.1600.0000 |
| 0x7 | 0000.1700.0000 |
| 0x8 | 0000.1800.0000 |
| 0x9 | 0000.1900.0000 |
| 0xA | 0000.1A00.0000 |
| 0xB | 0000.1B00.0000 |
| 0xC | 0000.1C00.0000 |
| 0xD | 0000.1D00.0000 |
| 0xE | 0000.1E00.0000 |
| 0XF | 0000.1F00.0000 |

In Table 1, bits 7-4 of the IMT destination address define the shelf address, and there are eight shelve addresses 0x0-0xF. The notation in the heading of the left hand column in Table 1 indicates that bits 7:4 of the IMT destination address are set to the values specified in the left hand column. In the right hand column, the notation in the column heading indicates that the values in the right hand column represent the first through the sixth bytes in a destination MAC address, where bytes are counted from left to right and each position in the values in the right hand column indicates four bits or a nibble. In the mapping scheme illustrated in Table 1, the upper nibble of the third byte (MAC DA(3)) is set to 0x1 to prevent IMT address 0x0 from mapping to an invalid MAC address of 0000.0000.0000. The lower nibble of MAC DA(3) is set to the IMT destination shelf address. For example, if the IMT destination shelf address is 0x0, MAC DA(3) will be set to 0x10. If the IMT destination shelf address is 0x1, MAC DA(3) will be set to 11.

The present invention is not limited to using the scheme illustrating in Table 2 for mapping between IMT addresses and MAC addresses. Any suitable mapping between IMT addresses and MAC addresses may be implemented without departing from the scope of the invention.

Returning to FIG. 4, once the IMT source and destination addresses have been mapped to Ethernet addresses in step 424, control proceeds to step 426 where the IMT packet is encapsulated in an Ethernet frame. Encapsulation in an Ethernet frame may be performed by inserting the IMT packet in the payload portion of the Ethernet frame. In step 428, the Ethernet frame is sent from the HMUX card to the destination via the Ethernet switch. The Ethernet switch performs a lookup in virtual ring frame distribution table 212 and distributes the frame to its intended destination. Thus, using the steps illustrated in FIG. 4, IMT packets can be distributed using low cost Ethernet hardware.

As stated above, virtual ring frame distribution table 212 illustrated in FIGS. 2A-2C is preferably configured to route frames intended for distribution among the various shelves and return to the sender using the star topology illustrated in FIGS. 2A-2C. Table 2 shown below illustrates exemplary data that may be provisioned in virtual ring frame distribution table 212 in the 3-shelf system illustrated in FIGS. 2A-2C.

TABLE 2

Virtual Ring Frame Distribution Data

| Destination MAC Address | Input Port(s) | Output Port(s) |
|---|---|---|
| 0000.1000.0000 | 1 | 2 |
|  | 2 | 7 |
|  | 3 | 2 |
| 0000.1100.0000 | 1 | 3 |
|  | 2 | 3 |
|  | 3 | 1 |
| 0000.1200.0000 | 1 | 7 |
|  | 2 | 7 |
|  | 3 | 1 |
| 0000.1300.0000 | 1 | 7 |
|  | 2 | 7 |
|  | 3 | 7 |
| 0000.1400.0000 | 1 | 7 |
|  | 2 | 7 |
|  | 3 | 7 |
| 0000.1500.0000 | 1 | 7 |
|  | 2 | 7 |
|  | 3 | 7 |
| 0000.1600.0000 | 1 | 7 |
|  | 2 | 7 |
|  | 3 | 7 |
| 0000.1700.0000 | 1 | 7 |
|  | 2 | 7 |
|  | 3 | 7 |
| 0000.1800.0000 | 1 | 7 |
|  | 2 | 7 |
|  | 3 | 7 |
| 0000.1900.0000 | 1 | 7 |
|  | 2 | 7 |
|  | 3 | 7 |
| 0000.1A00.0000 | 1 | 7 |
|  | 2 | 7 |
|  | 3 | 7 |
| 0000.1B00.0000 | 1 | 7 |
|  | 2 | 7 |
|  | 3 | 7 |
| 0000.1C00.0000 | 1 | 7 |
|  | 2 | 7 |
|  | 3 | 7 |
| 0000.1D00.0000 | 1 | 7 |
|  | 2 | 7 |
|  | 3 | 7 |
| 0000.1E00.0000 | 1 | 7 |
|  | 2 | 7 |
|  | 3 | 7 |
| 0000.1F00.0000 | 1 | 7 |
|  | 2 | 1 |
|  | 3 | 1 |

In Table 2, it is assumed that shelf 202 is the control shelf with destination MAC address 1F. Shelf 202 is connected to port 1 of Ethernet switch 208. Shelf 204 has MAC address 10 and is connected to port 2 of Ethernet switch 208. Shelf 206 has MAC address 11 and is connected to port 3 of Ethernet switch 208.

Referring to the first row after the heading in Table 1, if Ethernet switch 208 receives a frame with destination MAC address 10 on input port 1, the output port is 2, indicating that the frame should be forwarded to shelf 204. If Ethernet switch 208 receives a frame on input port 2 with destination MAC address 10, the output port is 7, indicating that the packet is incorrectly addressed and should be discarded. If an Ethernet frame is received on port 3 of switch 208 with destination MAC address 10, the output port is port 2, indicating that the frame should be forwarded to shelf 204.

Referring to the second row in Table 1, if the destination MAC address is 11 and the input port is 1, the output port is 3, indicating that the frame should be forwarded to shelf 206. If the destination MAC address is 11 and the input port is 2, the output port again is 3, indicating that the frame should be forwarded to shelf 206. In the last entry in the second row of Table 1, if the destination MAC address is 11 and the input port is 3, the output port is 1. The reason for this entry is to allow initial TSUs sent during startup to be routed to control shelf 202. TSUs are used to assign IMT addresses to cards. An exemplary processes for assigning IMT addresses to cards will now be described.

Figure 5:
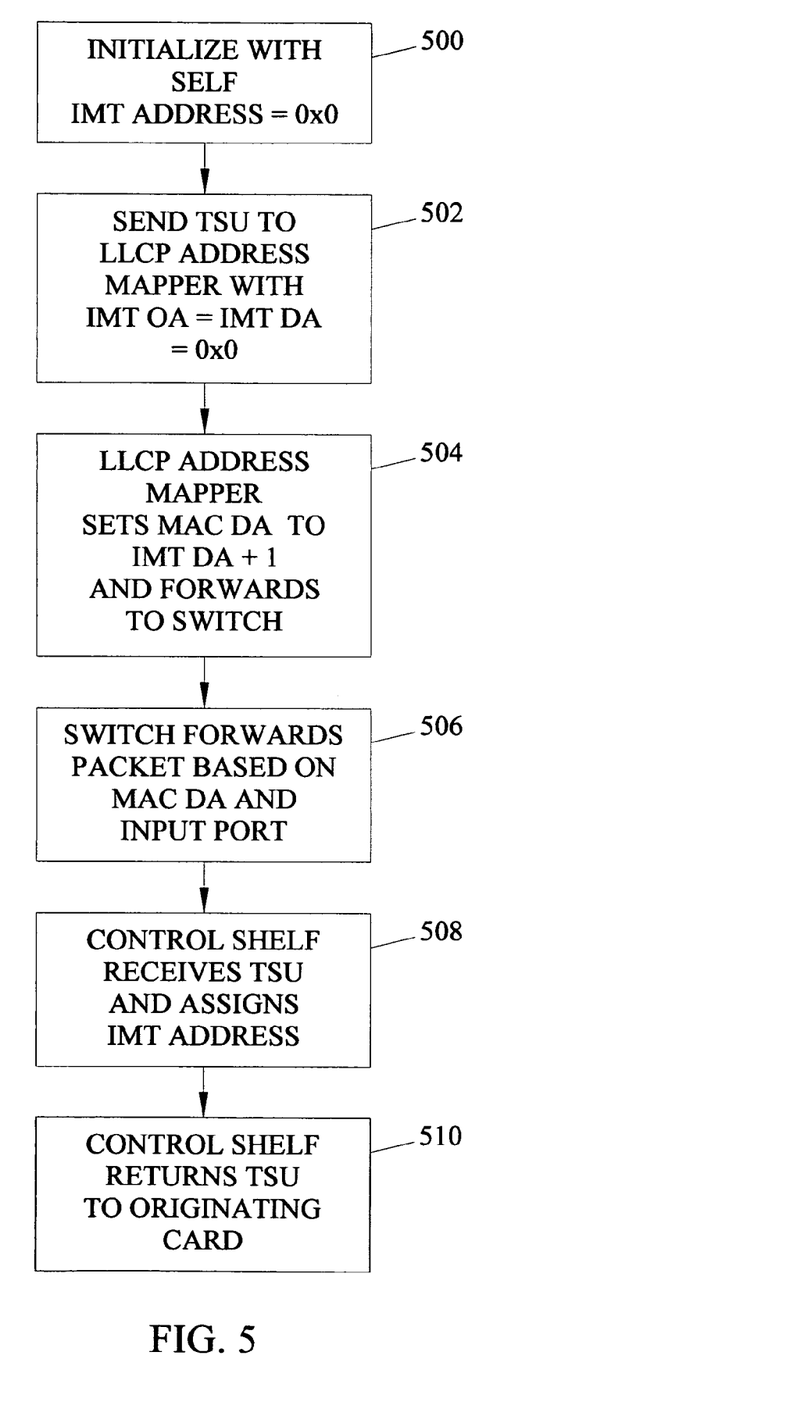
FIG. 5 is a flow chart illustrating exemplary steps for assigning ring-topology-based communications protocol addresses to cards or modules in a star topology according to an embodiment of the present invention.

FIG. 5 is a flow chart illustrating exemplary steps and routing methods by which cards discover their IMT addresses using TSUs in the star topology illustrated in FIGS. 2A-2C. Referring to FIG. 5, in step 500, each card initializes with a self-IMT address of 0x0. In step 502, each card sends a test signaling unit to it's associated LLCP address mapper with the IMT originating address and IMT destination addresses set to 0x0. In step 504, the LLCP address mapper associated with the originating card sets the MAC destination address to the IMT destination address plus one and forwards the frame to Ethernet switch 208. As indicated by steps 404 and 406 in FIG. 4, if shelf C 206 initially has an IMT address of 0x0, the MAC destination address in the outgoing frame that carries the TSU will have a destination MAC address of 0x11. The input port to switch 208 will be port 3. Accordingly, switch 208, using the data illustrated in Table 2, will forward the TSU to shelf 202 where OA&M module 112 will assign an IMT address. (Steps 506 and 508 illustrated in FIG. 5). In step 510, control shelf 202 returns the TSU to the originating card. This step may be performed using the steps illustrated in FIG. 4 and the data illustrated in Table 2.

Returning to Table 2, the third row contains data for routing self-addressed IMT packets received by shelf 206 back to shelf 202. Shelf 206 has a shelf IMT address of 0x1. Using the steps illustrated in FIG. 4, a self-addressed IMT packet with IMT DA=0x1 will be translated to MAC DA=0x12. Accordingly, if shelf 206 sends a self-addressed IMT packet to Ethernet switch 208 via port 3, the outgoing frame will have a destination MAC address of 0x12. Such packets should only appear on port 3. Accordingly, the first two entries in the third row of Table 1 indicate that if the destination MAC address is 12 and the input port is 1 or 2, the output port is 7, indicating that these packets are invalidly addressed. However, as illustrated by the third entry in row 3 of Table 2, if the destination MAC address is 0x12 and the input port is 3, the output port is 1, indicating that packets should be returned to shelf A 202. The third entry in row 3 of Table 1 thus completes the virtual ring and allows a ring-topology-based link level communications protocol to be implemented over a star-topology-based link level communications protocol.

Rows 3-15 in Table 2 contain invalid destination MAC addresses. Accordingly, if a packet is received at any of the input ports with any of these destination MAC addresses, the output port is 2, indicating that the packet should be discarded. The last row in Table 1 contains entries for frames addressed to the control shelf. If the destination MAC address is 0x1F and the input port is 1, this indicates a packet from the control shelf that is MAC addressed to the control shelf. Accordingly, such packets should be discarded. In the second entry in the last of row of Table 2, a packet addressed to MAC address 0x1F appearing on port 2 of Ethernet switch 208 should be forwarded from shelf B 204 to shelf A 202. Finally, the last entry in the last row of Table 2 indicates that a frame having a destination MAC address of 0x1F appearing on port 3 should be forwarded from shelf C 206 to shelf A 202.

Figure 6:
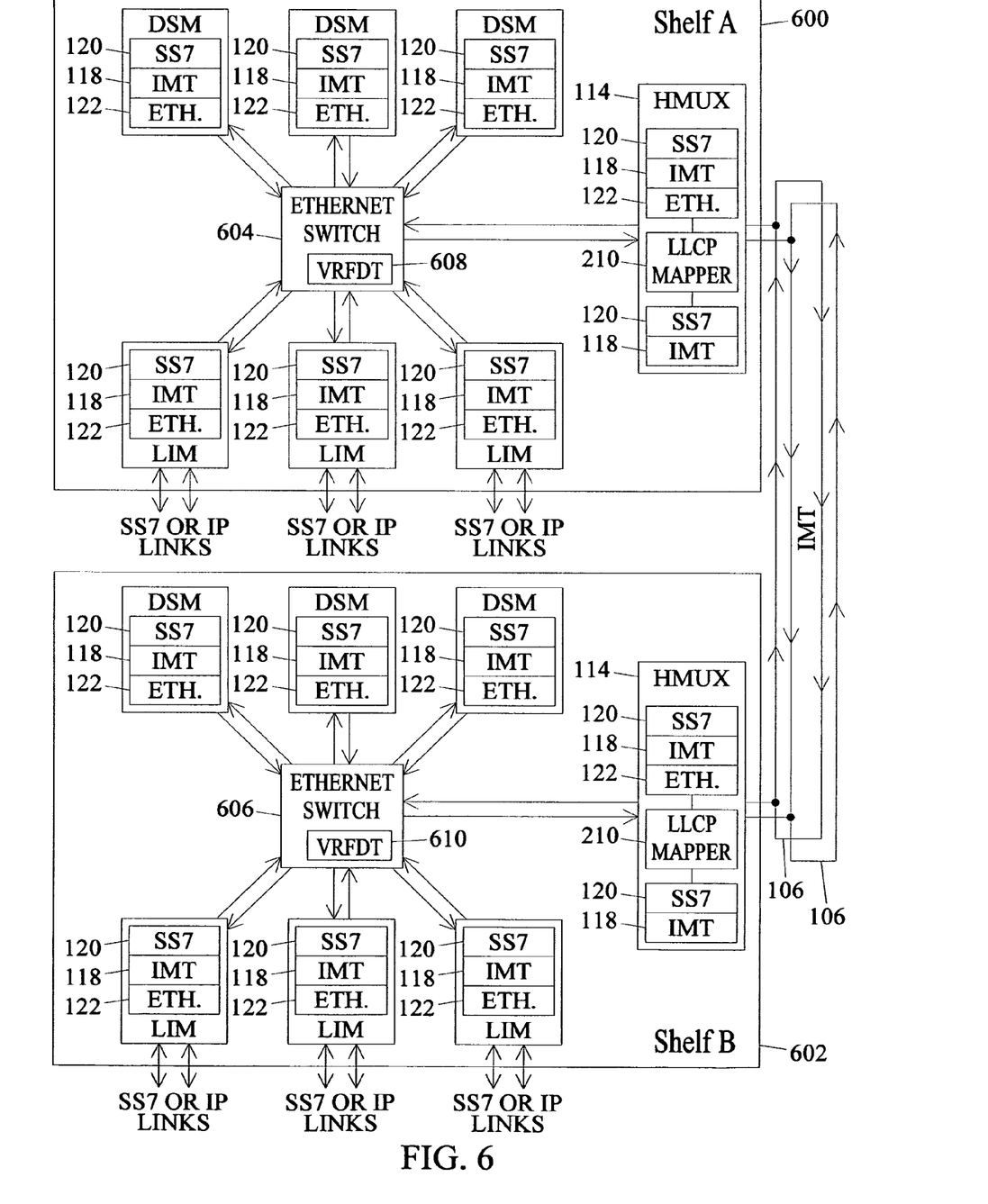
FIG. 6 is a block diagram of a signaling message routing node in which intra-shelf communications occur by tunneling packets of a ring-topology-based link level communications protocol in packets of a star-topology-based link level communications protocol and inter-shelf communications occur using a ring-topology-based link level communications protocol according to an embodiment of the present invention.

Although in the example illustrated in FIGS. 2A-2C, communications between cards within a shelf occur over a ring topology using a ring-topology-based link level communications protocol, and communications between shelves occur using a star topology and a star-topology-based link level communications protocol, the present invention is not limited to such an embodiment. In an alternate embodiment, communications between cards within each shelf may be implemented using a star topology and a star-topology-based link level communications protocol, and communications between shelves may be implemented using ring topology and a ring-topology-based link level communications protocol. FIG. 6 illustrates a routing node according to such an embodiment. Referring to FIG. 6, a signaling message routing node includes shelves 600 and 602. Shelf 600 includes an Ethernet switch 604 for communications between cards. Similarly, shelf 602 has an Ethernet switch 606 for communicating between cards within shelf 602. Shelves 600 and 602 are connected via counter-rotating, dual-ring buses 106.

In the example illustrated in FIG. 6, each card includes a protocol stack that implements an IMT layer 118, an SS7 layer 120, and an Ethernet layer 122. Each HMUX card 114 includes a link level communications protocol mapper that maps between the Ethernet-based protocol stack used between cards to a conventional SS7 over IMT stack used between shelves. Ethernet switches 604 and 606 may include virtual ring frame distribution tables 608 and 610 to provide a virtual ring topology between cards. The functionality of Ethernet switches 606 and 608 and link level communications protocol mappers is similar to that described above with regard to the embodiment illustrated in FIG. 2.

Figure 7:
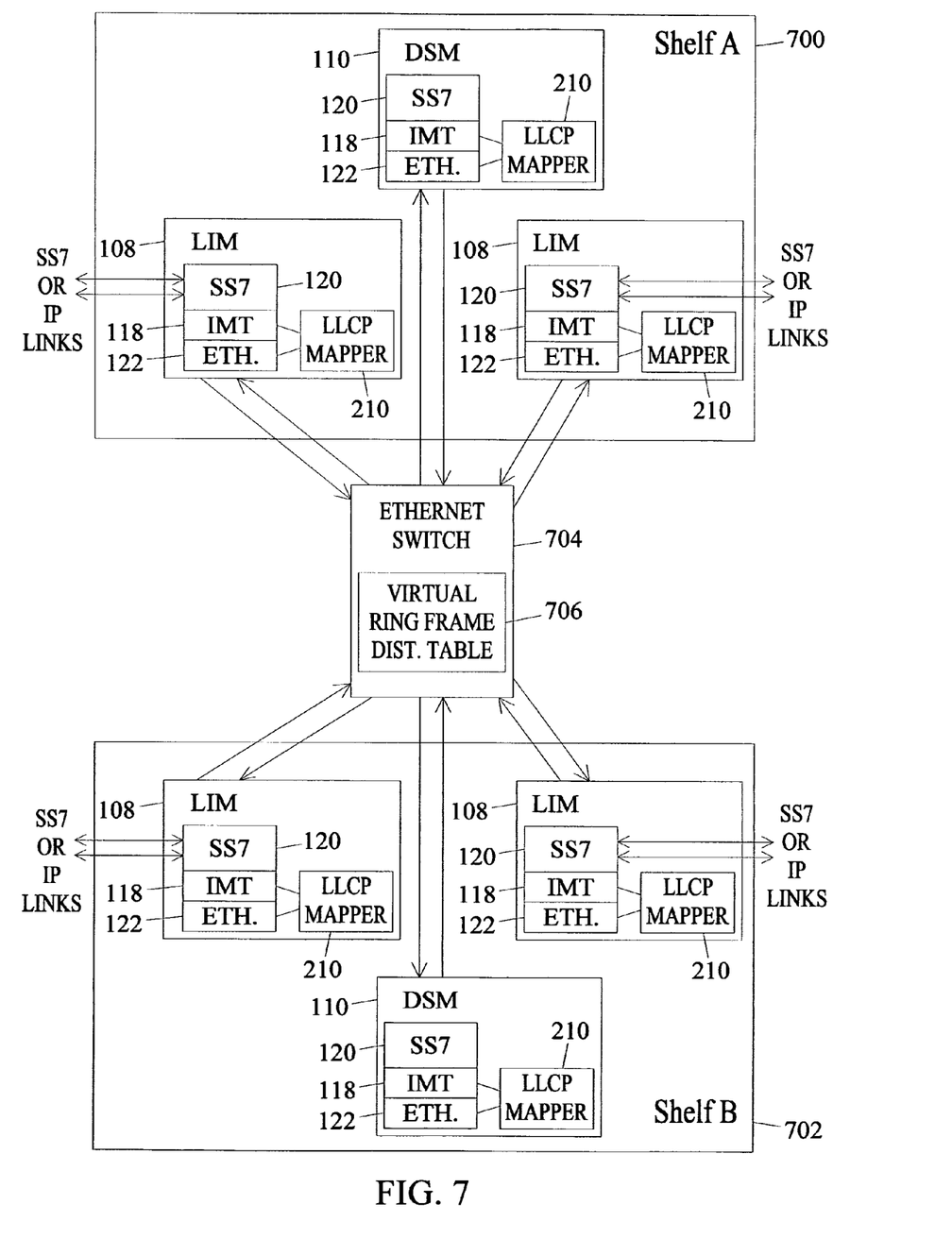
FIG. 7 is a block diagram illustrating a signaling message routing node in which communications between cards and shelves occur by tunneling packets of a ring-topology-based link level communications protocol in packets of a star-topology-based link level communications protocol according to an embodiment of the present invention.

In yet another alternate embodiment of the invention, communications between shelves and between cards in a signaling message routing node may occur over a star topology using a star-topology-based link level communications protocol. FIG. 7 illustrates a signaling message routing node according to this embodiment of the invention. Referring to FIG. 7, a signaling message routing node includes two shelves, shelf A 700 and shelf B 702. Shelves A and B 700 and 702 are connected to each other via Ethernet switch 704. In addition, the cards within each shelf are also connected via Ethernet switch 706. Each card illustrated in FIG. 7 implements a protocol stack including an IMT layer 118, an SS7 layer 120, and an Ethernet layer 122. Link level communication protocol mappers 210 present on each card map between IMT and Ethernet addresses as described above. In addition, link level communications protocol mappers 210 perform encapsulation and decapsulation operations. For example, link level communications protocol mappers may encapsulate outgoing IMT packets in Ethernet frames to be sent to other cards. For incoming packets destined for an SS7 application, LLCP mappers 210 may remove the IMT packets from Ethernet frames and pass the packets up the protocol stack to the IMT layer.

Ethernet switch 704 includes a virtual ring frame distribution table 706 for implementing virtual rings between cards within each shelf and between shelves. Such a table may be similar in structure to that described above with regard to Table 2 on the shelf and card level to implement the virtual rings between cards and between shelves.

Thus, the present invention includes methods and systems for communicating packets of a ring-topology-based link level communications protocol over a star topology using a star-topology-based link level communications protocol. Link level communications protocol mappers map addresses in the ring-topology-based link level communications protocol to addresses in the star-topology-based link level communications protocol. Ring-topology-based communications protocol packets that are intended to be distributed among multiple destinations in the system and returned to the sender are routed sequentially between destinations in the star topology. The destinations may include all cards and/or all shelves in a signaling message routing node. The MAC destination address in each outgoing frame is incremented before being sent to a switch. The switch uses a virtual ring frame distribution table to distribute packets forwarded by the last entity on a virtual ring back to the sender. Because a ring-topology-based link level communications protocol can be implemented over a star-topology-based link level communications protocol, vital functions performed by the ring-topology-based link level communications protocol can be preserved while leveraging the low cost hardware available for star-topology-based link level communications protocols, such as Ethernet.

Although the examples above relate to communications between modules in a signaling message routing node, the present invention is not limited to these examples. The methods and systems described herein for implementing a virtual ring topology over a star topology can be applied to any system in which communicating entities wish to implement virtual ring functionality over a star topology. For example, the methods and systems described herein may be used to implement a virtual ring topology in a network where computers are connected via a star topology, such as Ethernet.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for distributing packets of a ring-topology-based link level communications protocol over a star topology using a star-topology-based link level communications protocol, the method comprising:
   (a) receiving a packet of a ring-topology-based link level communications protocol;
   (b) determining whether the packet is intended to be forwarded to each of a plurality of destinations and returned to a sender;
   (c) in response to determining that the packet is to be forwarded to the destinations and returned to the sender, distributing the packet to each destination in the star topology and returning the packet to the sender using a star-topology-based link level communications protocol; and
   (d) in response to determining that the packet is not to be forwarded to the destinations and returned to the sender, converting a ring-topology-based link level communications protocol destination address in the packet to a star-topology-based link level communications protocol destination address, encapsulating the ring-topology-based protocol packet in a star-topology-based protocol packet having the star-topology-based destination address and forwarding the star-topology-based packet to its intended destination over the star topology.

2. The method of claim 1 wherein receiving a packet of a ring-topology-based link level communications protocol includes receiving a test signal unit (TSU).

3. The method of claim 1 wherein receiving a packet of a ring-topology-based link level communications protocol includes receiving a flow control message.

4. The method of claim 1 wherein determining whether the packet is intended to be distributed to the destinations and returned to the sender includes determining whether a source address in the packet is equal to a destination address in the packet.

5. The method of claim 1 wherein distributing the packet to each destination in the star topology and returning the packet to the sender using a star-topology-based link level communications protocol includes:
   (c)(i) at the sender, encapsulating the ring-topology-based protocol packet in a star-topology-based protocol packet, setting a destination address in the star-topology-based protocol packet to an address associated with a next destination in the star topology, and forwarding the star-topology-based protocol packet to a switch; and
   (c)(ii) at the switch, receiving the star-topology-based protocol packet at an input port, selecting an output port based on the address in the star-topology-based protocol packet and the input port, and forwarding the star-topology-based protocol packet over the selected output port.

6. The method of claim 5 wherein distributing the packet to each destination in the star topology and returning the packet to the sender using the star-topology-based link level communications protocol includes repeating steps (c)(i) and (c)(ii) at each destination until a final destination is reached, and, at the final destination, setting a destination address in the star-topology-based protocol packet to a predetermined value and forwarding the star-topology-based protocol packet to the switch, and, at the switch, looking up the output port based on the address in the star-topology-based protocol packet and the input port and forwarding the star-topology-based protocol packet to the sender based on results of the look-up.

7. The method of claim 1 wherein the destinations comprise at least one of all processing modules and all shelves within a telecommunications signaling message routing node.

8. The method of claim 7 wherein the processing modules are connected to each other via the star topology.

9. The method of claim 7 wherein groups of processing modules are connected to each other via the star topology and the processing module groups are connected to each other via a ring topology.

10. The method of claim 1 wherein the destinations comprise computers connected to each other in a network having the star topology.

11. The method of claim 1 wherein the star-topology-based link level communications protocol comprises Ethernet.

12. A signaling message routing node comprising:
   (a) a plurality of processing modules for sending and receiving telecommunications signaling messages and for communicating with each other using a ring-topology-based link level communications protocol;
   (b) a switch for connecting at least some of the processing modules in a star topology and for communicating messages between the processing modules using a star-topology-based link level communications protocol; and
   (c) at least one link level communications protocol mapper operatively associated with at least one of the processing modules for mapping addresses in the ring-topology-based link level communications protocol to addresses in the star-topology-based link level communications protocol and for encapsulating packets of the ring-topology-based link level communications protocol in packets of the star-topology-based link level communications protocol.

13. The signaling message routing node of claim 12 wherein the processing modules include SS7 link interface modules for sending and receiving SS7 signaling messages from SS7 signaling links, database services modules for providing database services for the telecommunications signaling messages, and multiplexer modules for connecting groups of link interface modules and database services modules to each other.

14. The signaling message routing node of claim 13 wherein the groups of link interface modules and database services modules are organized into shelves and the multiplexer modules connect the shelves.

15. The signaling message routing node of claim 14 wherein the shelves are connected to each other in a star topology and the groups of link interface modules and database service modules within each shelf are connected to each other in a ring topology.

16. The signaling message routing node of claim 14 wherein the shelves are connected to each other in a ring topology and the modules within each shelf are connected to each other in a star topology.

17. The signaling message routing node of claim 14 wherein the shelves and the groups of link interface modules and database service modules are connected to each other in a star topology.

18. The signaling message routing node of claim 12 wherein the switch and the link level communications protocol mapper distribute packets of the ring-topology-based link level communications protocol that are addressed for distribution and return to a sending module among the processing modules using the star-topology-based link level communications protocol.

19. The signaling message routing node of claim 18 wherein the switch includes a virtual ring frame distribution table including entries that connect the processing modules in a virtual ring topology for distributing packets of the ring-topology-based link level communications protocol that are addressed for distribution and return to a sending module.

20. The signaling message routing node of claim 12 wherein the link level communications protocol mapper maps addresses of packets of the ring-topology-based link level communications protocol that are addressed for distribution and return to a sender into addresses of the star-topology-based link level communications protocol so that the packets that are addressed for distribution and return to the sender will be forwarded among a virtual ring of processing modules in the star topology.

21. A computer program product comprising computer executable instructions embodied in a computer readable medium for performing steps comprising:
   (a) receiving a packet of ring-topology-based link level communications protocol;
   (b) determining whether the packet is addressed for distribution and return to a sender;
   (c) in response to determining that the packet is addressed for distribution and return to the sender, mapping a destination address in the packet to a destination address of a star-topology-based link level communications protocol, encapsulating the packet in a star-topology-based packet of the star-topology-based link level communications protocol having the destination address, and forwarding the star-topology-based packet to a next destination in a virtual ring implemented over the star topology; and
   (d) in response to determining that the packet is not addressed for distribution and return to the sender, translating an address in the packet to an address of the star-topology-based link level communications protocol, encapsulating the packet in a packet of the star-topology-based link level communications protocol having the translated address, and forwarding the packet to a destination corresponding to the translated address.

22. The computer program product of claim 21 wherein receiving a packet of a ring-topology-based link level communications protocol includes receiving a packet including a telecommunications signaling message.

23. The computer program product of claim 22 wherein receiving a packet including a telecommunications signaling message includes receiving a packet from a link interface module within a signaling message routing node.

24. The computer program product of claim 21 wherein determining whether the packet of the ring-topology-based link level communications protocol is addressed for distribution and return to the sender includes determining whether source and destination addresses of the ring-topology-based link level communications protocol packet are equal to each other.

25. The computer program product of claim 21 wherein distributing the packet of the ring-topology-based link level communications protocol to a next destination in the virtual ring topology includes setting the destination address of the star-topology-based link level communications protocol packet to a next address in the virtual ring topology and forwarding the star-topology-based link level communications protocol packet to a switch.

26. The computer program product of claim 21 wherein translating the address of the ring-topology-based link level communications protocol to an address of the star-topology-based link level communications protocol includes accessing a table including mappings from ring-topology-based link level communications protocol addresses to star-topology-based link level communications protocol addresses.

27. The computer program product of claim 21 wherein the star-topology-based link level communications protocol comprises Ethernet.

\* \* \* \* \*